Feb. 4, 1964   F. K. H. NALLINGER ETAL   3,120,396
FRAME BEARER CONSTRUCTION, ESPECIALLY VEHICLES
Filed Nov. 9, 1960   2 Sheets-Sheet 1
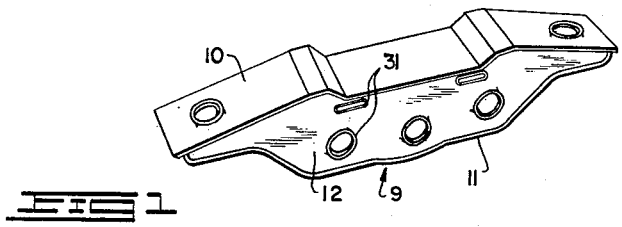
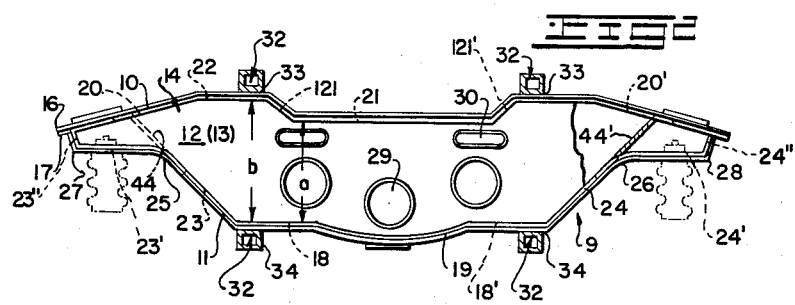
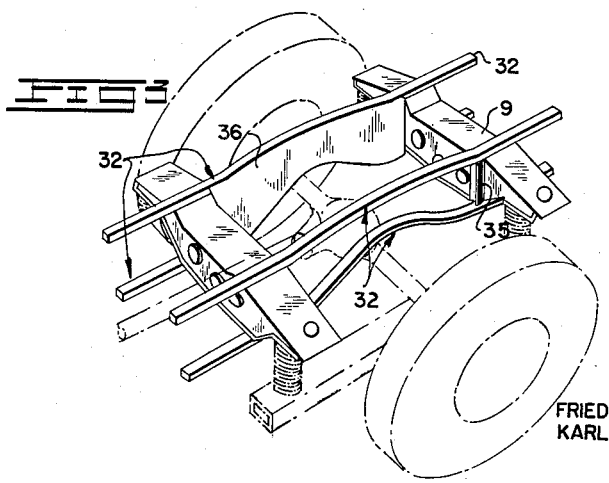
INVENTORS
FRIEDRICH K. H. NALLINGER
KARL WILFERT
BY Dicke, Craig and Freudenberg
ATTORNEYS

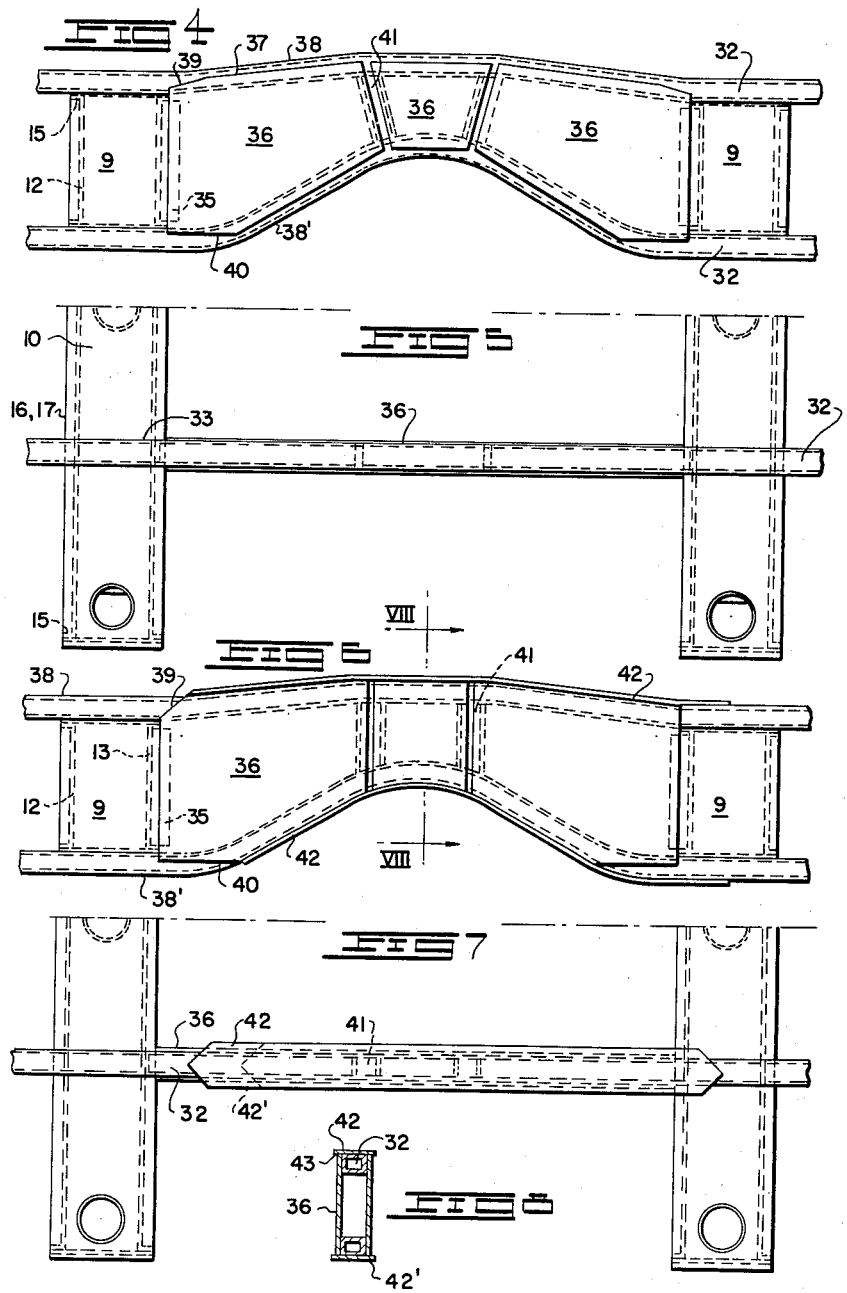

3,120,396
FRAME BEARER CONSTRUCTION, ESPECIALLY VEHICLES

Friedrich K. H. Nallinger, Stuttgart, and Karl Wilfert, Stuttgart-Degerloch, Germany, assignors to Daimler-Benz Aktiengesellschaft, Stuttgart-Unterturkheim, Germany
Filed Nov. 9, 1960, Ser. No. 68,231
Claims priority, application Germany Nov. 10, 1959
5 Claims. (Cl. 280—106)

The present invention relates to a cross bearer construction for vehicles which consists of relatively thin-walled stamped or pressed sheet metal parts, and especially to a spring cross bearer adapted to cooperate with the vehicle springs which is provided with a longitudinal bearer connection preferably for relatively heavy vehicles such as busses.

The present invention aims at an unobjectionable, completely satisfactory support for the spring elements provided at the framework of a motor vehicle and to enable, by the connection of the cross bearer members with a longitudinal bearer connection, the attainment of a greater torsion rigidity without increased material expenditures as well as a reduction of the constructional height on the part of the vehicle such as busses.

Additionally, the present invention aims at accommodating the conduits, pipes and lines such as electric cables, oil lines, pneumatic lines, exhaust pipes and the like which have to be normally arranged within the motor vehicle, in a space-having manner and adequately protected against external influences such as weather, dampness, moisture, etc.

Cross bearer members are known in the prior art which consist of pressed or stamped sheet metal parts and are built into an auxiliary frame, whereby the free ends of the cross bearer members serve for purposes of supporting thereon coil springs.

Additionally, motor vehicle frames are known in the prior art which include longitudinal bearer members constructed as hollow bearers which are connected with cross bearers consisting of square tubular members whereby the longitudinal bearers are guided between the upper and lower chords of the cross bearer members and are welded thereto. These prior art longitudinal bearers are rigidly connected with the square tubular members by means of gusset or connecting plates whereby web portions provided with bores are arranged at the gusset or connecting plates which accommodate the bolt members of the springs.

It is not possible with the known, prior art cross bearer constructions to achieve an unobjectionable mounting or support for the pneumatic springs without the use of additional reinforcing members and web portions and to create thereby a space-saving accommodation, protected against external influences, for the exhaust pipes, pneumatic lines, oil lines and the like which is imperative with a compact construction, especially with busses.

Additionally, the prior art constructions of cross bearer members known heretofore offer an assurance, only with increased material expenditures, for the achievement in connection with the longitudinal members of the vehicle frame, of an unobjectionable rigidity meeting the safety requirements.

The present invention is concerned with the task to eliminate the aforementioned inadequacies, and essentially consists in constructing the cross bearer member of trapezoidal shape and as a box-type member closed on all sides thereof whereby the cross bearer member may be provided with apertures, preferably at the same height or level, the cross sections of which are matched to the cross sections of the pipe, tube and line profiles intended to be extended through these apertures, and whereby these apertures may be constructed in such a manner that they serve simultaneously as reinforcements of the cross bearer member.

Additionally, the present invention consists in a cross bearer member constructed as spring supporting cross bearer which, in connection with a longitudinal bearer connection is inserted into longitudinal bearers arranged in a pair-like manner.

Accordingly, it is an object of the present invention to provide a cross bearer construction as well as an interconnection with a longitudinal bearer assembly which obviate the inadequacies and disadvantages encountered in the prior art constructions.

It is still another object of the present invention to provide a vehicle cross bearer construction, particularly suitable for relatively heavy type vehicles such as busses which assures a completely satisfatcory support for the spring elements, especially pneumatic spring elements, provided at the vehicle frame of the motor vehicle.

Still another object of the present invention resides in the provision of a transverse bearer construction for motor vehicles which enables the attainment of a greater torsional rigidity without increased material expenditures, particularly by its adaptability to be combined with a simple longitudinal bearer connection.

A further object of the present invention lies in the provision of a cross bearer member construction which, upon assembly with the longitudinal bearer assembly permits a reduction of the structural height of the vehicle.

A still further object of the present invention resides in the provision of a cross bearer member which is so constructed and arranged as to offer very high rigidity while at the same time effectively protecting, against external influences, the elements controlling the progress of the vehicle such as the lines, pipes and cables such as electric cables, oil lines, pneumatic lines, exhaust pipes and the like without in any way endangering the rigidity of the cross bearer member itself.

A still further object of the present invention resides in the provision of a simple yet sturdy cross bearer member which is adapted to be assembled in a simple manner with a longitudinal bearer formation to provide an overall frame work that is relatively inexpensive in manufacture and assembly yet provides the necessary rigidity required of present day motor vehicles as regards safety thereof.

These and other objects, features and advantages of the present invention will become more obvious from the following description when taken in connection with the accompanying drawing which shows, for purposes of illustration only, several embodiments in accordance with the present invention and wherein FIGURE 1 is a perspective view of a cross bearer member, especially of a spring-supporting cross bearer member in accordance with the present invention, FIGURE 2 is an elevational view partly broken away of a cross bearer member according to the present invention in connection with a longitudinal bearer connection, FIGURE 3 is a perspective view of a longitudinal bearer connection connected to cross bearer members and located within the area of the rear axle whereby one pair of longitudinal bearers is illustrated without covering plates, FIGURE 4 is an elevational view of a longitudinal bearer connection in accordance with the present invention, FIGURE 5 is a partial top plan view of FIGURE 4, FIGURE 6 is an elevational view of a modified embodiment of a longitudinal bearer connection in accordance with the present invention, FIGURE 7 is a partial top plan view of FIGURE 6, and FIGURE 8 is a cross sectional view taken along line VIII—VIII of the longitudinal bearer member of FIGURE 6 covered on all sides thereof.

Referring now to the drawing wherein like reference numerals are used throughout the various views to designate like parts, and more particularly to FIGURES 1 and 2 thereof, reference numeral 9 generally designates therein the cross bearer member in accordance with the present invention. The cross bearer member 9 consists of one upper chord or wall 10 and of a lower chord or wall 11 made of sheet-metal strips cut out of blanks whose mutually opposite edges extend parallelly as well as of two approximately trapezoidally shaped boundary walls 12 and 13 along the peripheral edges of which generally designated by reference numeral 14 (FIGURE 2) are provided rectangularly bent flanges 15 (FIGURES 4 and 5). The laterally exposed edges of the flanges 15, against which rest the rim portions of the upper and lower chords 10 and 11, are disposed in the same plane as the edges 16 and 17 (FIGURES 2 and 5) of the upper and lower chords 10 and 11 so as to enable welding of the rim portions of the upper and lower chords 10 and 11 with the flanges 15 in one operation. The individual parts are welded to one another, for example, by spot welding along the abutting surface portions between flanges 15 and oppositely disposed rim portions of the chords 10 and 11. However, seam welding along the outer edges of the parts may also be used whereby the welded seam will come to lie within the plane of the edges thereof. The lower edge portions 18 and 18' (FIGURE 2) of the boundary walls 12 and 13 which are disposed along the outer lower ends on both sides of the center edge portion 19, extend essentially horizontally whereas the center section 19 of the lower edges of the boundary walls 12 and 13 is constructed in a slightly downwardly arcuate manner. The upper edges of the boundary walls 12 and 13 extend in the center section 21 thereof (FIGURE 2) essentially horizontally and therewith parallelly to the lower edge portions 18 and 18'. The sections 22 and 22' of the upper edges which are disposed essentially opposite the lower edge portions 18 and 18' extend also essentially horizontally (FIGURE 2). The edges of the boundary walls 12 and 13 are angularly bent downwardly as edge portions 20 and 20' from the corners defining the outer end of a respective horizontal section 22 and 22' and extend downwardly outwardly with a smaller slope than the edge portions 121 and 121' effectively connecting the horizontal center section 21 with a corresponding horizontal edge portion 22 and 22'. The distance $a$ between the horizontal center section 21 of the upper edge of the boundary walls 12 and 13 and the horizontal lower edge portions 18 and 18' is smaller than the distance $b$ between the horizontal lower edge portions 18 and 18' and the oppositely disposed horizontal edge portions 22 and 22' of the upper edges. The lateral edge portions 23 and 24 of the boundary walls 12 and 13 extend from the outer corners of the lower edge portions 18 and 18' obliquely upwardly toward the upper edges 20 whereby the lateral edge portions 23 and 24 are angularly bent at points 25 and 26 to pass over into horizontal edge portions 23' and 24'. The edge portions 23' and 24' are again angularly bent at points 27 and 28 to pass over thereat into upwardly outwardly inclined edge portions 23" and 24". The sections 23" and 24" of the edge portions 23 and 24 which extend from the corners 27 and 28 in the direction toward the upper edge portions 20 and 20' intersect perpendicularly or nearly perpendicularly the angularly downwardly sloping upper edge portions 20 and 20'. For purposes of increasing the rigidity of the cross bearer member 9, reinforcing side plates 44 and 44' may be arranged therewithin which extend from the corners 25 and 26 in extension of the side edge portions 23 and 24 toward the upper chord 10.

The lateral boundary walls 12 and 13 of the cross bearer construction in accordance with the present invention have been described as to the configuration thereof by reference to the peripheral edges thereof, and more particularly by reference to the various edge portions and sections to describe the exact configuration of approximately trapezoidal shape of the boundary walls 12 and 13.

Described in another way, each of the boundary walls 12 and 13, as shown in FIGURES 1 and 2 comprises a central portion of substantially trapezoidal shape defined by lower edge portion 23, 18, 19, 18', 24 and by the upper edges 22, 121, 21, 121' and the horizontal edge adjoining the latter; this trapezoidal shape being further defined by imaginary lines joining the outer ends of the first and last of the upper edges just referred to to the outer ends of the edge portions 23 and 24. As shown in FIGURES 1 and 2 the trapezoidal central section just described is joined at each end thereof by terminal portions 20, 23' and 20', 24', respectively, whose profiles taper in directions toward their outer ends 23" and 24" respectively.

Three circularly-shaped and two elongated apertures 29 and 30 are arranged within the center section of the boundary walls 12 and 13 which are provided with crimped rim portions 21 (FIGURE 1) that serve for the reinforcement of the lateral boundary walls 12 and 13 as well as for purposes of protection of the lines guided therethrough against damage thereof.

The upper and lower chords 10 and 11 are constructed in such a manner that they are matched to the outer edges of the boundary walls 12 and 13 which may extend either parallelly or also obliquely with an upward or downward inclination.

In combination with a longitudinal bearer connection, longitudinal bearers 32 consisting of a square profile member are welded in a pair-like manner, for purposes of avoiding dangerous notch effects, on each side of the cross bearers 9 preferably also arranged in a pair-like manner with the mutually facing sides 33 and 34 thereof at the horizontally extending surfaces of the upper and lower chords 10 and 11, respectively.

A section of a longitudinal bearer connection which is provided especially for the rear axle of a bus is illustrated in different embodiments in FIGURES 3 to 8. FIGURE 3 thereby shows in phantom lines the wheels of the vehicle as well as the axles thereof which are spring-supported by pneumatic springs of any known construction against the cross bearer 9, whereby the pneumatic springs abut against the outwardly extending, essentially horizontal portions of the lower chord 11. Of course, coil springs of suitable construction or the like may also be substituted and used in the place of the pneumatic springs if so desired.

U-shaped profile bearer members 35 (FIGURES 3, 4 and 6) are welded to the mutually facing boundary walls 12 and 13 of the two web members 36 and to cross bearer members 9 which are inserted between the longitudinal bearers 32. The web portions 36 (FIGURES 4 through 8) provided between the cross bearers 9 which may consist of a single piece, cover the longitudinal bearer members 32 on both sides (FIGURE 8) whereby the longitudinal edge portions 37 thereof extend only approximately up to or near the upper edge 38 and lower edge 38' of the longitudinal bearer members 32 and whereby the corners 39 and 40 adjoining the cross bearers 9 are bevelled in order to assure a gradual transition of the rim stresses from the inner sides of the longitudinal bearers 32 toward the outer sides thereof (FIGURES 3 and 4).

The square profile bearers 41 which, as shown in FIGURE 4, are provided between the longitudinal bearers 32 and serve as braces may also be arranged, as shown in FIGURE 6 perpendicularly to the longitudinal bearers 32.

The web portions 36 of the embodiment of FIGURE 6 extend up to the upper edge 38 and down to the lower edge 38' of the longitudinal bearers 32.

The steel bands or steel straps 42 and 42' which may have different lengths (FIGURES 6 and 7) cover the longitudinal bearer members 32 on top and on the bottom thereof, respectively, and serve the purpose of reinforcing the longitudinal bearer connection. As welding seams 43 are used the otherwise necessary welding seams for the connection of the longitudinal bearer members 32 with the web portions 36, and more particularly at the edges 38 and 38' of the longitudinal bearers 32 (FIGURE 8).

An unobjectionable, completely staisfactory support of the springs as well as a higher torsion rigidity without increased material expenditures and a reduction of the height of the vehicle body, especially for busses is achieved by a cross bearer construction in accordance with the present invention, which is used in particular as spring cross bearer in connection with a longitudinal bearer connection.

More particularly, the present invention provides a cross bearer construction which is the result of efforts in the direction of developing the manufacture of a bus of light-weight construction. The present invention thereby resulted in a cross bearer arrangement which consists of a plurality of pressed sheet-metal parts which can be connected with each other in the most simple manner. The lateral boundary sheet-metal walls 12 and 13 are constructed essentially of trapezoidal shape whereby the angularly bent flanges 15 thereof serve as abutments for the upper and lower chords 10 and 11 which conform exactly to the contour of the side walls 12 and 13. A box-shaped cross bearer was formed by this combination of the individual pressed sheet-metal parts which not only could be manufactured in a simple and easy manner but also absorbs in an advantageous manner the different loads which occur as a result of the spring forces acting thereagainst as well as of the twisting forces due to the longitudinal bearer connection.

Exhaustive tests of the cross bearer construction in accordance with the present invention have clearly indicated that the cross bearer in accordance with the present invention conforms to the moment diagram of the loads occurring as a result of bending forces in such a manner that the entire cross section of the cross bearer can be designated as ideally suited for that purpose. The moments are absorbed in the cross bearer of the present invention exactly at the places where the largest and most unimpaired cross-sectional height (b) exists. The moment diagram effectively becomes zero in the center of the cross bearer so that the apertures 29 are of no significance since the portion of the transverse bending forces amounts to only four percent of the over-all deformation.

Also in combination with a longitudinal bearer connection, the cross bearer in accordance with the present invention absorbs in case of loading of the longitudinal bearer connection in torsion, a part of the torsional or twisting moment, and more particularly, at that place where the longitudinal bearers 32 abut against the upper and lower chords 10 and 11 and the cross bearer 9 itself has a fully enclosed cross section.

Consequently, the loads which result from bending and twisting forces are distributed in the cross bearer member according to the present invention in such a manner that the permissive stresses in all parts of the construction thereof are utilized in a far-reaching and even manner.

While we have shown and described several embodiments in accordance with the present invention, it is understood that the same is not limited thereto but is susceptible of many changes and modifications within the spirit and scope of the present invention and we, therefore, do not wish to be limited to the details shown but intend to cover all such changes and modifications as are encompassed by the scope of the appended claims.

We claim:

1. A cross bearer construction for a vehicle consisting solely of relatively thin-walled pressed sheet metal parts constituting a box-type bearer member closed on all sides thereof, said member comprising front and rear boundary walls, each of said boundary walls comprising a central portion of substantially trapezoidal shape and terminal portions extending from said central portion, in cantilever relationship therewith, said terminal portions having profiles tapering in directions toward the outer ends of said portions, said boundary walls being provided along the entire extent of their edge portions with flange portions, said box-type bearer member further comprising top and bottom walls having edge portions complementary in shape to said flange portions and being secured respectively to said flange portions, said last-mentioned edge portions abutting said flange portions throughout the entire length of the latter, each said central portion comprising end sections of equal height and a section intermediate said end sections, the height of said end sections being greater than that of said intermediate section, mutually aligned apertures in said central portions adapted to accommodate operating lines of said vehicle, the walls of said apertures having reinforcement means for said boundary walls, the upper edge of said intermediate section extending horizontally and the lower edge of said intermediate section having a convex portion extending in a downward direction, said lower edge comprising horizontal portions joining said convex portion at the opposite ends thereof, said top and bottom walls having edge portions extending outwardly of and generally transversely to said boundary walls in the direction of the length of said bearer member, each said terminal portion comprising an upper edge portion and bent legs of unequal length extending in series from said lower edge of said central portion, the outermost of said legs joining said upper edge portion and forming substantially a right angle therewith, reinforcing means connecting one of said bent legs and said upper edge portion, square profiled longitudinal bearer members being secured to said upper and lower walls in the region of said end sections of equal height, said longitudinal bearer members being provided at their outwardly facing upper and lower sides with reinforcing steel bands, said longitudinal bearer members being provided at their vertically extending sides with reinforcing web portions, said web portions having beveled corner portions.

2. A cross bearer construction for a vehicle according to claim 1, further comprising vehicle supporting spring elements, said terminal portions comprising means adapted to receive said spring elements.

3. A cross bearer construction for a vehicle according to claim 1, wherein said operating lines comprise lines controlling the progress of said vehicle.

4. A frame structure for vehicles, especially buses, comprising two cross bearer members, each said cross bearer member being made solely of relatively thin-walled stamped-out sheet metal parts including an upper wall, a lower wall, and two upright boundary walls having central portions of trapezoidal shape and terminal portions extending from said central portion, said terminal portions having profiles tapering in directions toward the outer ends of said portions, said boundary walls being provided along the entire extent of their edge portions with flange portions, said upper and lower walls having edge portions conforming in shape to and abutting said flange portions throughout the length of the latter, said upper wall comprising spaced upper, essentially horizontal surface portions, said lower wall comprising spaced lower, essentially horizontal surface portions, longitudinal bearer members arranged in pairs, each of said pairs comprising an upper member and a lower member, said upper member having side surfaces connected by a lower surface, said lower member having side surfaces connected by an upper surface, said longitudinal bearer members being secured to said cross bearer member with a said lower surface of each said upper member in abutment with a respective one of said spaced upper surface portions and a said upper surface of each said lower member in abutment with a respective one of said spaced lower surface portions, said two cross bearer members being interconnected by said longitudinal bearers, said longitudinal bearers being welded to the respective said upper and lower surface portions of said two cross bearer members, web means disposed intermediate each said pair of longitudinal bearer members, said web means being secured to a boundary wall of each of said cross bearer members, U-shaped profile members welded to said web means and to said boundary wall of each of said cross bearer members for rigidly securing said web means to said boundary wall of each of said cross bearer members.

5. A frame structure for vehicles according to claim 4, wherein said longitudinal bearer members are provided with reinforcing means comprising steel bands contacting a further two of said lower surfaces and a further two of said upper surfaces, said steel bands extending in directions of their lengths along said lower and upper surfaces intermediate said two cross bearer members.

References Cited in the file of this patent

UNITED STATES PATENTS

| | | |
|---|---|---|
| 776,175 | Dodds | Nov. 29, 1904 |
| 1,357,073 | Mooney | Oct. 26, 1920 |
| 1,471,044 | Lovejoy | Oct. 16, 1923 |
| 1,846,567 | Murray | Feb. 23, 1932 |
| 1,965,561 | Sherman | July 3, 1934 |
| 2,119,800 | Tull | June 7, 1938 |
| 2,136,122 | Almdale | Nov. 8, 1938 |
| 2,669,462 | Toncray | Feb. 16, 1954 |
| 2,954,998 | Kushler | Oct. 4, 1960 |

FOREIGN PATENTS

| | | |
|---|---|---|
| 380,979 | Italy | June 14, 1940 |
| 892,555 | Germany | Oct. 8, 1953 |